(12) United States Patent
Ichikawa et al.

(10) Patent No.: US 11,303,167 B2
(45) Date of Patent: Apr. 12, 2022

(54) SPIRALLY WOUND LAMINATED CORE FOR A ROTARY ELECTRIC MACHINE, METHOD FOR MANUFACTURING SPIRALLY WOUND LAMINATED CORE OF A ROTARY ELECTRIC MACHINE, AND ROTARY ELECTRIC MACHINE

(71) Applicant: Mitsubishi Electric Corporation, Tokyo (JP)

(72) Inventors: Asami Ichikawa, Tokyo (JP); Takashi Umeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 217 days.

(21) Appl. No.: 16/482,532

(22) PCT Filed: Feb. 22, 2018

(86) PCT No.: PCT/JP2018/006582
§ 371 (c)(1),
(2) Date: Jul. 31, 2019

(87) PCT Pub. No.: WO2018/163852
PCT Pub. Date: Sep. 13, 2018

(65) Prior Publication Data
US 2020/0195067 A1     Jun. 18, 2020

(30) Foreign Application Priority Data
Mar. 6, 2017     (JP) .............................. JP2017-041596

(51) Int. Cl.
*H02K 1/27* (2022.01)
*H02K 15/03* (2006.01)
(Continued)

(52) U.S. Cl.
CPC ................. *H02K 1/27* (2013.01); *H01F 3/06* (2013.01); *H01F 27/24* (2013.01); *H02K 15/02* (2013.01)

(58) Field of Classification Search
CPC ........ H02K 1/27; H02K 1/2706; H02K 1/274; H02K 1/276; H02K 1/28; H02K 2201/06; H02K 15/02; H02K 15/03
(Continued)

(56) References Cited

U.S. PATENT DOCUMENTS

| 4,613,780 A | * | 9/1986 | Fritzsche | ................. H02K 1/16 |
| | | | | 310/216.043 |
| 2005/0179334 A1 | * | 8/2005 | Yoshinaga | ............. H02K 29/03 |
| | | | | 310/156.47 |

(Continued)

FOREIGN PATENT DOCUMENTS

| JP | H02023048 A | 1/1990 |
| JP | H08223831 A | 8/1996 |

(Continued)

OTHER PUBLICATIONS

International Search Report (with English translation) and Written Opinion issued in corresponding International Patent Application No. PCT/JP2018/006582, 10 pages (dated May 29, 2018).

*Primary Examiner* — Michael Andrews
(74) *Attorney, Agent, or Firm* — Buchanan Ingersoll & Rooney PC

(57) ABSTRACT

A laminated core of a rotary electric machine having: a first spiral core constituent body layer configured by linking a plurality of metal first core constituent pieces that have a magnet mounting part, the first spiral core constituent body layer being wound in a spiral shape as an integral body; and a second spiral core constituent body layer configured by linking the plurality of first core constituent pieces and a metal second core constituent piece that has a magnet (Continued)

mounting part, the second core constituent piece having a different longitudinal-direction length than do the first core constituent pieces, and the second spiral core constituent body layer being wound in a spiral shape as an integral body. The second spiral core constituent body layer is laminated on the first spiral core constituent body layer in continuation with the first spiral core constituent body layer.

10 Claims, 10 Drawing Sheets

(51) Int. Cl.
    *H01F 3/06* (2006.01)
    *H01F 27/24* (2006.01)
    *H02K 15/02* (2006.01)

(58) Field of Classification Search
    USPC .... 310/216.004, 216.008, 216.009, 216.011, 310/216.013
    See application file for complete search history.

(56) References Cited

U.S. PATENT DOCUMENTS

| | | | |
|---|---|---|---|
| 2007/0046125 A1* | 3/2007 | Torii | H02K 1/276 310/156.53 |
| 2009/0146519 A1* | 6/2009 | Myojin | H02K 1/276 310/156.53 |
| 2012/0019093 A1* | 1/2012 | Maki | B21D 28/10 310/216.013 |
| 2013/0038163 A1* | 2/2013 | Kim | H02K 15/03 310/156.16 |

FOREIGN PATENT DOCUMENTS

| | | |
|---|---|---|
| JP | 2009081939 A | 4/2009 |
| JP | 2013017281 A | 1/2013 |

\* cited by examiner

SPIRALLY WOUND LAMINATED CORE FOR A ROTARY ELECTRIC MACHINE, METHOD FOR MANUFACTURING SPIRALLY WOUND LAMINATED CORE OF A ROTARY ELECTRIC MACHINE, AND ROTARY ELECTRIC MACHINE

TECHNICAL FIELD

The present invention relates to a laminated core with step skew for a rotary electric machine, a method of manufacturing a laminated core for a rotary electric machine, and a rotary electric machine.

BACKGROUND ART

Hitherto, there is known an interior permanent magnet (IPM) motor, which is manufactured in such a manner that, after lamination of hoop materials, each having a hole having the same shape as a sectional shape of a magnet member, through, for example, press working, the magnet member is inserted into the hole.

For example, in a case of a laminated core for a rotary electric machine, which is described in Patent Literature 1, the core for an IPM motor is manufactured in the following manner. The hoop material having the magnet-member insertion holes, which is formed of a metal plate such as a magnetic steel plate, is curved in a horizontal plane direction to be rolled up. Then, the hoop materials are laminated in a spiral manner. In the laminated core described above, the hoop materials are subjected to press working so that the positions of the holes, each having the same shape as the sectional shape of the magnet member, are slightly shifted for each layer. The magnet members are inserted into the holes to provide oblique skew to the rotor.

CITATION LIST

Patent Literature

[PTL 1] JP 2013-17281 A

SUMMARY OF INVENTION

Technical Problem

However, with the laminated core for a rotary electric machine, which is described in Patent Literature 1, it is not easy to provide step skew, and hence, the oblique skew is provided instead. Thus, the magnet members, each having an inclined shape, are required to be used. As a result, a magnet area with respect to a sectional area of the laminated core becomes smaller to lower a magnetic flux intensity. As a result, motor efficiency is decreased.

The present invention has been made to solve the problem described above, and has an object to provide a laminated core for a rotary electric machine, a method of manufacturing a laminated core for a rotary electric machine, and a rotary electric machine, with which step skew can easily be provided to a motor core to increase efficiency of a motor.

Solution to Problem

According to one embodiment of the present invention, there is provided a laminated core for a rotary electric machine, including: a first spiral core forming body layer including a plurality of first core forming pieces, each being made of a metal and having a magnet mounting portion, the plurality of first core forming pieces being continuously formed and to be spirally rolled up as a single continuous body; and a second spiral core forming body layer including a plurality of the first core forming pieces and at least one second core forming piece, which has a length different from a length of each of the plurality of first core forming pieces in a longitudinal direction of each of the first core forming pieces and the second core forming piece, has the magnet mounting portion, and is made of the metal, the plurality of first core forming pieces and the at least one second core forming piece being continuously formed and to be spirally rolled up as a single continuous body. The second spiral core forming body layer is formed on the first spiral core forming body layer so as to be continuous with the first spiral core forming body layer. The at least one second core forming piece is located at a head of the second spiral core forming body layer, and wherein positions of the magnet mounting portions of the plurality of first core forming pieces and the at least one second core forming piece in the second spiral core forming body layer are shifted from positions of the magnet mounting portions of the plurality of first core forming pieces in the first spiral core forming body layer in a circumferential direction of the laminated core.

Further, according to one embodiment of the present invention, there is provided a method of manufacturing a laminated core for a rotary electric machine, including the steps of: forming, through press working, first core forming pieces, each having a magnet mounting portion, and at least one second core forming piece, which has a length different from a length of each of the plurality of first core forming pieces in a longitudinal direction of each of the plurality of first core forming pieces and the at least one second core forming piece, and has a magnet mounting portion, on a band-shaped hoop member made of a metal to be fed along a longitudinal direction of the band-shaped hoop member; forming a first band-shaped core forming body including a plurality of the first forming pieces continuously formed; forming a second band-shaped core forming body including a plurality of the first core forming pieces and the at least one second core forming piece, which are continuously formed so that the second band-shaped core forming body is continuous with the first band-shaped core forming body; and spirally rolling up the first band-shaped core forming body and the second band-shaped core forming body as a single continuous body.

Advantageous Effects of Invention

According to the laminated core for a rotary electric machine and the method of manufacturing a laminated core for a rotary electric machine according to one embodiment of the present invention, the step skew can easily be provided to the motor core to enhance the efficiency of the motor.

DESCRIPTION OF EMBODIMENTS

Now, embodiments of the present invention are described with reference to the drawings. Note that, in the following drawings, the same or corresponding portions are denoted by the same reference symbols, and the overlapping description thereof is omitted.

First Embodiment

Figure 1:
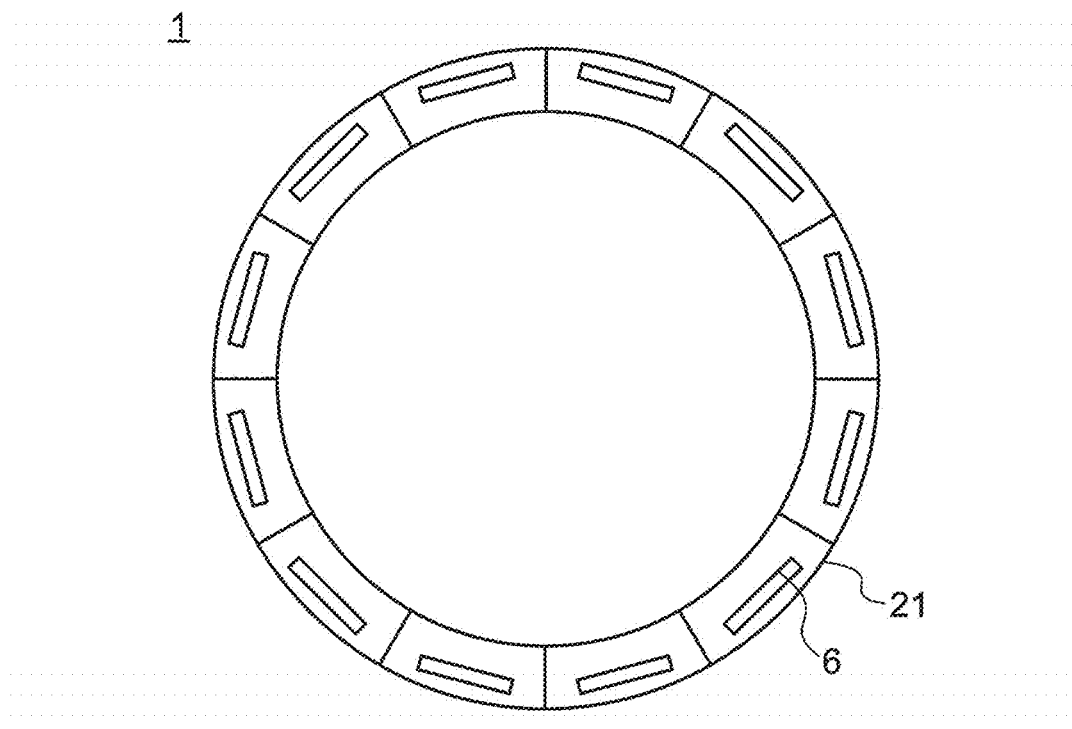
FIG. 1 is a plan view of a laminated core for a rotary electric machine according to a first embodiment of the present invention.
Figure 2:
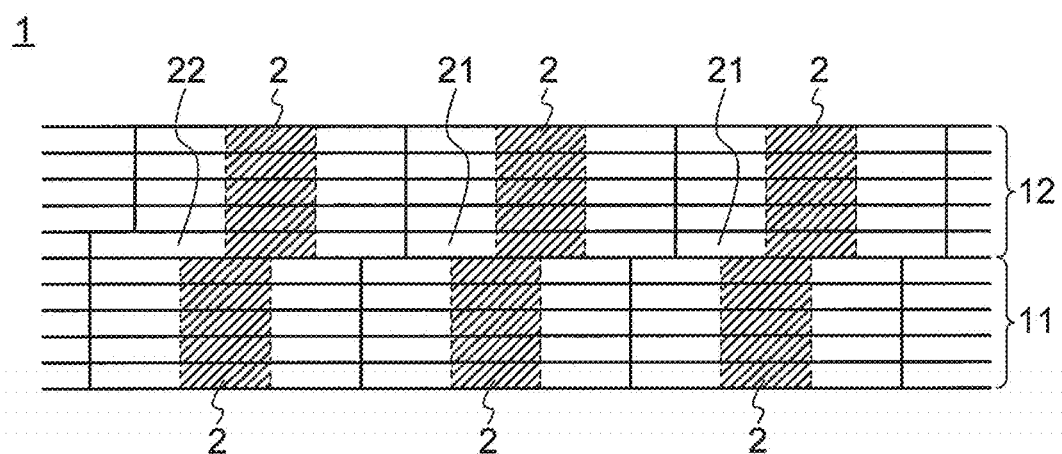
FIG. 2 is a side view of the laminated core.
Figure 3:
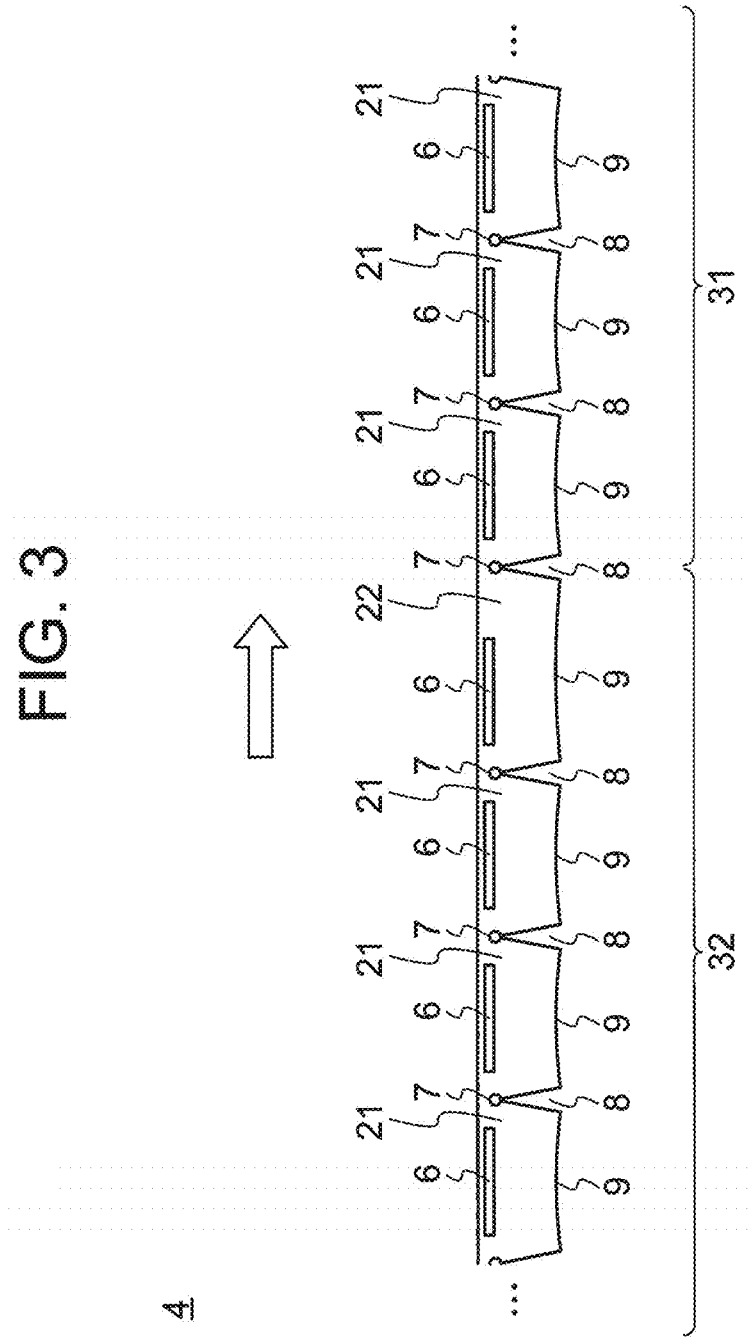
FIG. 3 is a view for illustrating a band-shaped core member configured to form a laminated core.

FIG. 1 is a plan view of a laminated core for a rotary electric machine according to a first embodiment. FIG. 2 is a side view of the laminated core. FIG. 3 is a view for illustrating a band-shaped core member configured to form the laminated core.

As illustrated in the plan view of FIG. 1, a laminated core 1 for a rotary electric machine is formed by rolling up a plurality of core forming pieces 21, each having a magnet-member insertion hole 6, into a circular shape. The laminated core 1 is used for a motor being a rotary electric machine. The laminated core 1 is formed by spirally rolling up a band-shaped core member 4 described later to form a laminate.

As illustrated in the side view of FIG. 2, the laminated core 1 includes two layers, specifically, a core upper layer 12 and a core lower layer 11. In the core upper layer 12 and the core lower layer 11, magnet members 2 indicated by hatching are provided. The core lower layer 11 is formed by laminating the core forming pieces 21 made of a metal in five layers. The core upper layer 12 is a laminate of five layers. The core upper layer 12 includes a skewed core forming piece 22 made of a metal provided at one position in a lowermost layer and the core forming pieces 21. The skewed core forming piece 22 is has a length longer than that of each of the core forming pieces 21 in a longitudinal direction of the core forming pieces 21 and the skewed core forming piece 22. With this configuration, the magnet members 2 in the core upper layers 12 are located at positions shifted from positions of the magnet members 2 in the core lower layer 11 in a horizontal direction, specifically, a circumferential direction of the laminated core 1, to thereby form step skew. The amount of shift of the magnet members 2 in the circumferential direction of the laminated core 1 is referred to as "skew width".

Further, the magnet members 2 are inserted into the magnet-member insertion holes 6 of the core forming pieces 21 and the skewed core forming piece 22. Hence, in the following description, only a shift of the positions of the magnet-member insertion holes 6 is described, and the description of the shift of the magnet members 2 is omitted. The core lower layer 11 corresponds to a first spiral core forming body layer, and the core upper layer 12 corresponds to a second spiral core forming body layer.

The laminated core 1 is formed by spirally rolling up the band-shaped core member 4 illustrated in FIG. 3 as a single continuous body. The band-shaped core member 4 includes a continuous portion for core lower layer 31 and a continuous portion for core upper layer 32, which are continuously formed. The continuous portion for core lower layer 31 is spirally rolled up as a single continuous body to form the core lower layer 11. The continuous portion for core upper layer 32 is spirally rolled up as a single continuous body to form the core upper layer 12. The continuous portion for core lower layer 31 includes the plurality of core forming pieces 21, which are continuously formed. The continuous portion for core upper layer 32 includes the skewed core forming piece 22 at a head at which the continuous portion for lower layer 31 ends so as to be continuous therewith. Subsequent to the skewed core forming piece 22, the plurality of core forming pieces 21 are formed so as to be continuous therewith. In this example, one skewed core forming piece 22 is formed. Two or more skewed core forming pieces 22 may be formed. With the structure described above, at least one skewed core forming piece 22 is formed at the head of the core upper layer 12. The continuous portion for core lower layer 31 corresponds to a first band-shaped core forming body, and the continuous portion for core upper layer 32 corresponds to a second band-shaped core forming body. The core forming piece 21 corresponds to a first core forming piece, and the skewed core forming piece 22 corresponds to a second core forming piece.

The core forming pieces 21 and the skewed core forming piece 22 each have the magnet-member insertion holes 6. On the side opposite to the magnet-member insertion hole 6, each of the core forming pieces 21 or the skewed core forming piece 22 has an arc-shaped side 9. Between two adjacent core forming pieces 21 or skewed core forming piece 22, a slit 8 having a V-like shape is formed. At a distal end of the slit 8, a relief hole 7 is formed. The position of the magnet-member insertion hole 6 in the skewed core forming piece 22 is shifted from the position of the magnet-member insertion hole 6 in each of the core forming pieces 21. The magnet-member insertion holes 6 each serve as magnet mounting portions.

Next, a schema of a method of manufacturing the laminated core for a rotary electric machine in the first embodiment is described.

Figure 4:
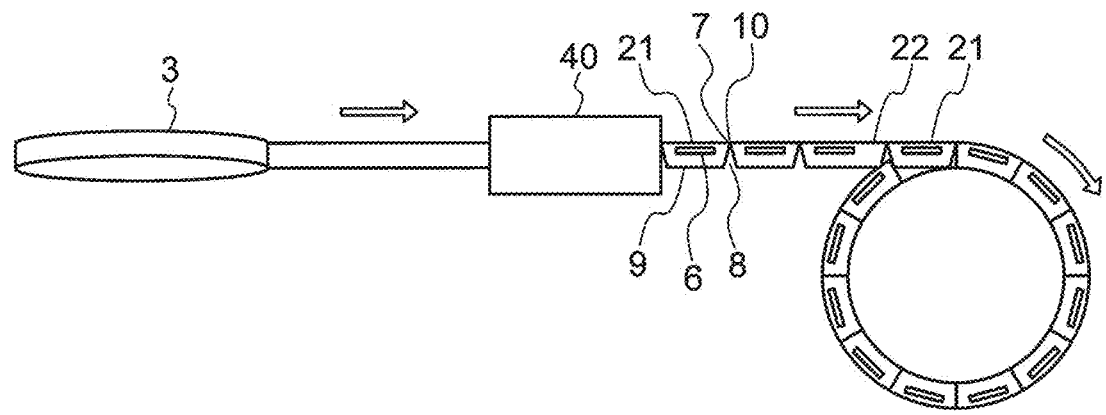
FIG. 4 is a plan view for illustrating a schema of a method of manufacturing the laminated core.
Figure 5:
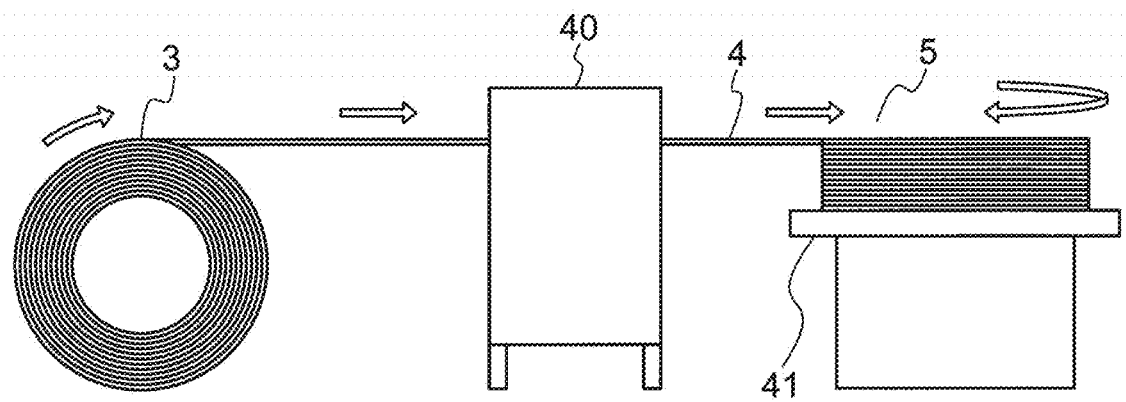
FIG. 5 is a side view for illustrating the schema of the method of manufacturing the laminated core.

FIG. 4 is a plan view for illustrating the schema of the manufacturing method, and FIG. 5 is a side view for illustrating the schema of the manufacturing method.

First, as illustrated in FIG. 4, a band-shaped hoop member 3 made of a metal, which is a metal steel plate, is fed in a longitudinal direction of the band-shaped hoop member 3 by a hoop feeding device (not shown) to be supplied to a press machine 40. The press machine 40 performs press working on the supplied band-shaped hoop member 3 to form the band-shaped core member 4. The band-shaped core member 4 includes the core forming pieces 21 and the skewed core forming piece 22, each having the magnet-member insertion hole 6, the slit 8, the relief hole 7, and the arc-shaped side 9.

The magnet-member insertion hole 6 is formed as a penetrating hole in each of the core forming pieces 21 and the skewed core forming piece 22. The slit 8 is formed to have the V-like shape between the core forming pieces 21 or the skewed core forming piece 22. The relief hole 7 has an approximately circular shape and is formed at the distal end of the V-like shape of each of the slits 8.

Next, as illustrated in FIG. 5, the core forming piece 21 at a head of the band-shaped core member 4 is fixed to a rotary table 41. Through rotation of the rotary table 41, the core forming pieces 21 and the skewed core forming piece 22 are rolled up. Through the roll-up of the core forming pieces 21 and the skewed core forming piece 22, the band-shaped core member 4 is curved in a width direction of the core forming piece 21, to thereby form one loop corresponding to one layer. Through lamination of the loops in a spiral manner, a spirally rolled-up core member 5 is formed. Further, through processing of the spirally rolled-up core member 5, the laminated core 1 is formed.

Next, press forming for manufacturing the band-shaped core member 4 is described.

Figure 6:
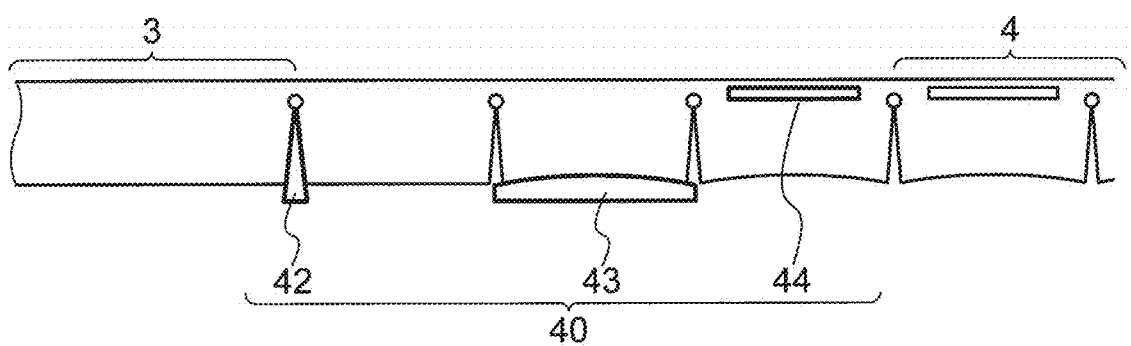
FIG. 6 is a view for illustrating details of press working.
Figure 7:
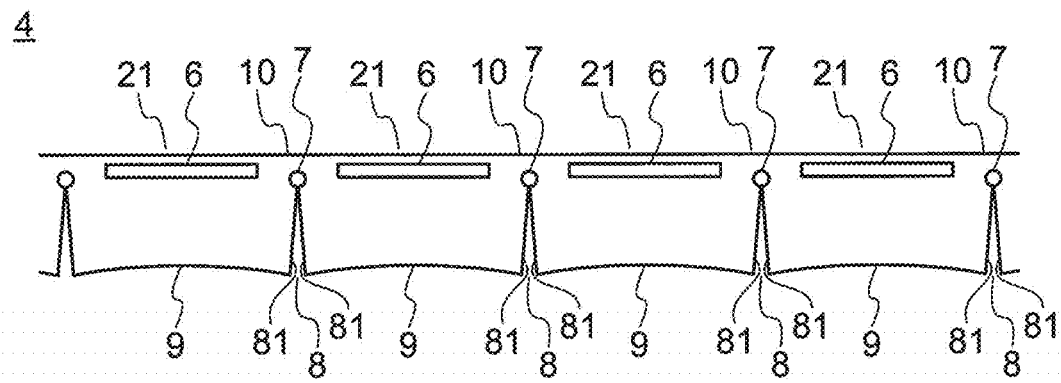
FIG. 7 is a view of the band-shaped core member manufactured by the press working.
Figure 8:
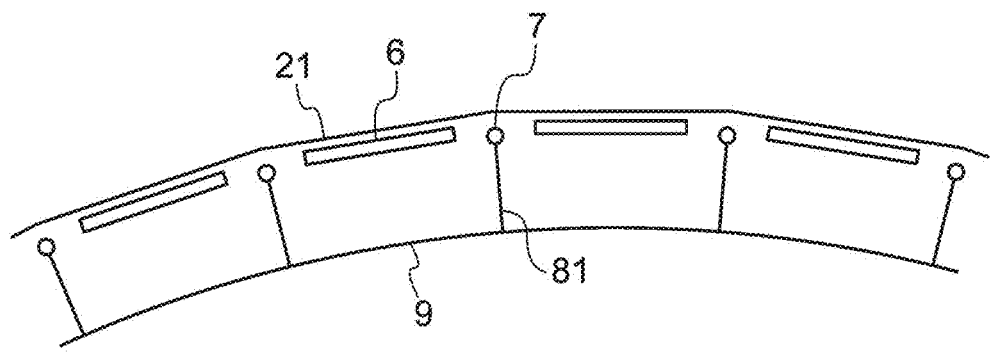
FIG. 8 is a view for illustrating a state after the band-shaped core member of FIG. 7 is curved.

FIG. 6 is a view for illustrating details of the press working. FIG. 7 is a view of the band-shaped core member manufactured by the press working, and FIG. 8 is a view for illustrating a state after the manufactured band-shaped core member is curved.

As illustrated in FIG. 6, in the press machine 40, three dies, specifically, a slit die 42, an arc die 43, and a magnet-member insertion hole die 44 are used in combination.

Specifically, through progressive press working, the slit 8 and the relief hole 7 are formed with use of the slit die 42, the arc-shaped side 9 is formed with use of the arc die 43, and the magnet-member insertion hole 6 is formed with use of the magnet-member insertion hole die 4. As a result, the band-shaped core member 4, specifically, the core forming pieces 21 and the skewed core forming piece 22 are formed.

At this time, a feed amount of the band-shaped hoop member 3 with use of the hoop feeding device becomes equal to a length of one core forming piece 21 or one skewed core forming piece 22. The skewed core forming piece 22 has the length longer than that of the core forming piece 21 by the skew width. The longer length of the skewed core forming piece 22 is achieved by increasing the feed amount of the band-shaped hoop member 3 with use of the hoop feeding device. Further, the skewed core forming piece 22 has the magnet-member insertion hole 6 formed at a position at a distance increased by the skew width. Specifically, the magnet-member insertion hole 6 of the skewed core forming piece 22 is formed by the press working so as to be shifted rearward by the skew width. The above-mentioned formation of the magnet-member insertion hole 6 in the skewed core forming piece 22 can be achieved by delaying timing of the press working with use of the magnet-member insertion hole die 44.

As described above, through control of the feed amount of the band-shaped hoop member 3 and the timing of the press working for the magnet-member insertion hole 6, the position of the magnet-member insertion hole 6 can arbitrary be set.

Further, the skewed core forming piece 22 has the arc-shaped side 9 having a longer length than that of the core forming piece 21 by a length corresponding to the skew width. Accordingly, when the arc-shaped sides 9 of the skewed core forming piece 22 and the core forming pieces 21 are formed by the press working, the arc dies 43, which are prepared individually for the skewed core forming piece 22 and the core forming pieces 21, may be used or the arc die 43 for the longer length may be used for both of the skewed core forming piece 22 and the core forming pieces 21.

In FIG. 7, the thus formed band-shaped core member 4 is illustrated. As illustrated in FIG. 7, the slit 8 is defined by two inclined sides 81 opposed to each other. A state in which the core forming pieces 21 are curved so as to bring the two inclined sides into contact with each other is illustrated in FIG. 8. The band-shaped core member 4 illustrated in FIG. 7 is continuously curved as described above and is then spirally rolled up, to thereby form the spirally rolled-up core member 5 illustrated in FIG. 5.

According to the manufacturing method of the first embodiment, the spirally rolled-up core member 5 is formed through the spiral roll-up of the core forming pieces 21, which are continuously formed. Therefore, at the start of roll-up of a second turn after the end of roll-up for a first turn, a difference in height is generated between the first turn and the second turn by a thickness of the band-shaped core member 4. Besides, burr generated due to the press working and a tolerance of a thickness of the band-shaped hoop member 3, the core forming piece 21 may sometimes be increased in thickness or expanded when the band-shaped core member 4 is curved. Through accumulation of the differences described above, the spirally rolled-up core member 5 after the formation may have a variation in lamination height.

Hence, after the formation of the spirally rolled-up core member 5, pressing is performed on the whole spirally rolled-up core member 5. Through the pressing, a gap between the first turn and the second turn can be minimized as much as possible. Accordingly, the laminated core 1 having a uniform height can easily be formed.

At the time of the pressing, it is required that a position of the spirally rolled-up core member 5 be prevented from being shifted with respect to the rotary table 41. In order to achieve the prevention of the shift of the position described above, any of the following methods may be used. In one of the methods, the first core forming piece 21 in the first layer, with which the lamination is started, and the last core forming piece 21 in a final layer, with which the lamination is terminated, are fixed to each other through welding. In another one of the methods, recesses are formed on the core forming pieces 21 and protrusions are formed on the rotary table 41 so that the recesses and the protrusions are fitted together.

In the latter case, it is desired that the recess formed on the core forming piece 21 be positioned vertically to a plate width direction with respect to the magnet-member insertion hole 6 and arranged on the arc-shaped side 9 so as not to interfere with a magnetic path of the magnet member 2. Specifically, it is desired that the recess be formed in a central portion of the arc-shaped side 9.

After the formation of the laminated core 1, it is desired that the laminate be fixed by vertically fastening with use of bolts provided to pass through all the layers or the layers be connected to each other through bead welding at several positions on each of lamination surfaces. In this manner, a lamination shape of the laminated core 1 can be maintained.

Next, the relief hole 7 is described in detail with reference to FIG. 9 to FIG. 11.

Figure 9:
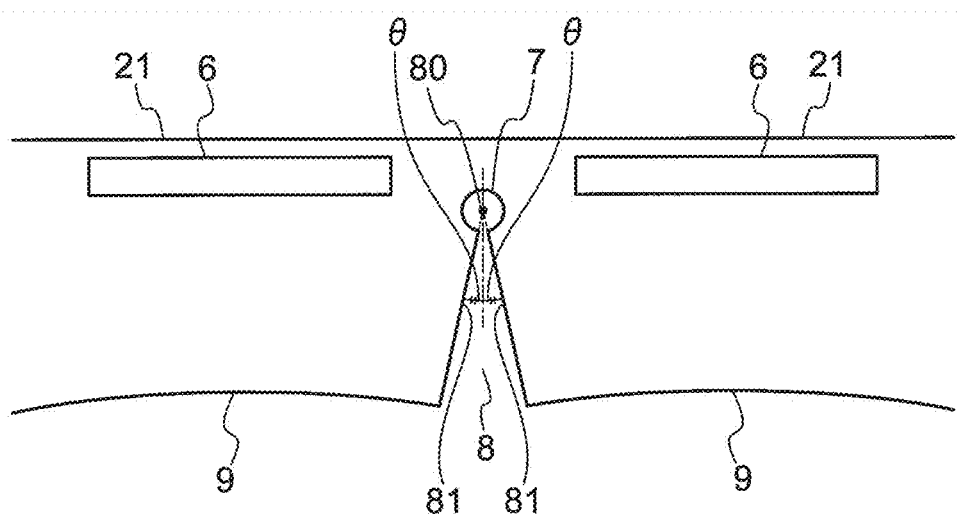
FIG. 9 is a view for illustrating a slit and a relief hole, which are formed between core forming pieces.

FIG. 9 is a view for illustrating the slit and the relief hole, which are formed between the core forming pieces.

As illustrated in FIG. 9, the core forming piece 21 has the magnet-member insertion hole 6 and the arc-shaped side 9. Between the core forming pieces 21 adjacent to each other, the slit 8 and the relief hole 7 at the distal end of the slit 8 are formed. The core forming piece 21 is continuous with the core forming piece 21 adjacent thereto through a joint portion 10.

The slit 8 is a cutout formed by combination of the two inclined sides 81 into a V-like pattern. The two inclined sides 81 are processed so as to be mirror-symmetric with respect to a center line of the slit 8. Specifically, the slit 8 is a cutout defined by the two inclined sides 81, which are equilateral and equiangular with respect to the plate-width direction.

An inclination angle θ of the inclined side 81 is defined as an angle at a slit vertex 80 being an intersection on extension lines of the two inclined sides 81. The inclination angle θ is dependent on the number of poles of the magnet member 2 and is expressed as: inclination angle θ [deg]= (360 degrees/number of poles)/2.

The inclined side 81 of the core forming piece 21 and the inclined side 81 of the core forming piece 21 adjacent thereto are brought into contact with each other to eliminate a space of the slit 8. In this manner, the band-shaped core member 4 is curved to form the spirally rolled-up core member 5. When the inclined side 81 of the core forming piece 21 and the inclined side 81 of the core forming piece 21 adjacent thereto, which are opposed to each other, are brought into contact with each other so as to eliminate the space of the slit 8, the band-shaped core member 4 is curved with the slit vertex 80 serving as a flexural center to deform the joint portion 10. A tensile force is applied to the joint portion 10 in a circumferential direction of the spirally rolled-up core member 5 to reduce a thickness of the core forming piece 21 at the joint portion 10.

As a force in the opposite direction, after the two inclined sides 81 are brought into contact with each other, the inclined sides 81 are pressed against each other so that compressive forces act thereon. A member at the portion at which the compressive force is applied rises to increase a thickness of a portion at the periphery of the inclined side 81. When the core forming pieces 21, each having the increased thickness, are laminated, an increase in thickness is accumulated for the number of laminated layers. As a result, dimensional accuracy of a height of the spirally rolled-up core member 5 is reduced.

In order to reduce the increase in thickness, the relief hole 7 having an approximately circular shape is formed with a portion concentric with a center of the slit vertex 80 or a point on the inner side of the slit vertex 80 along a radial direction of the spirally rolled-up core member 5 as a center.

Through the formation of the relief hole 7, even after the inclined sides 81 are brought into contact with each other, the joint portion 10 is curved while the relief hole 7 is deformed. Therefore, in comparison to a case without the relief hole 7, the increase in thickness of the core forming piece 21 can be suppressed.

Next, a result of verification of a degree of increase in thickness of the core forming portion 21 depending on a position of the relief hole is described.

Figure 10:
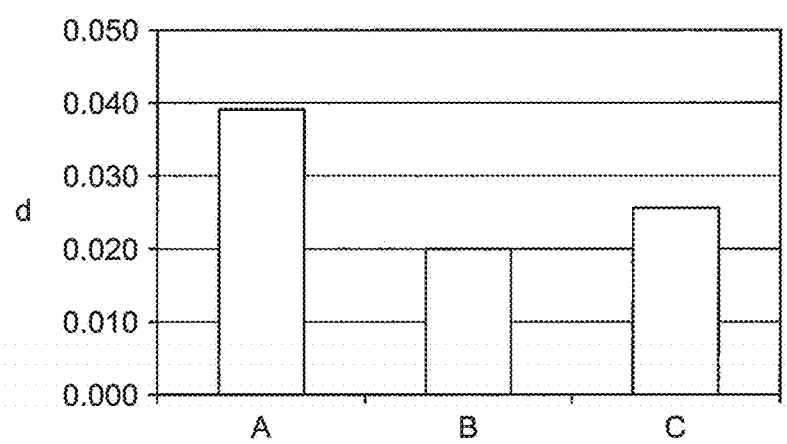
FIG. 10 is a graph for showing results of measurements of increase in thickness of the core forming piece depending on a position of the relief hole.
Figure 11:
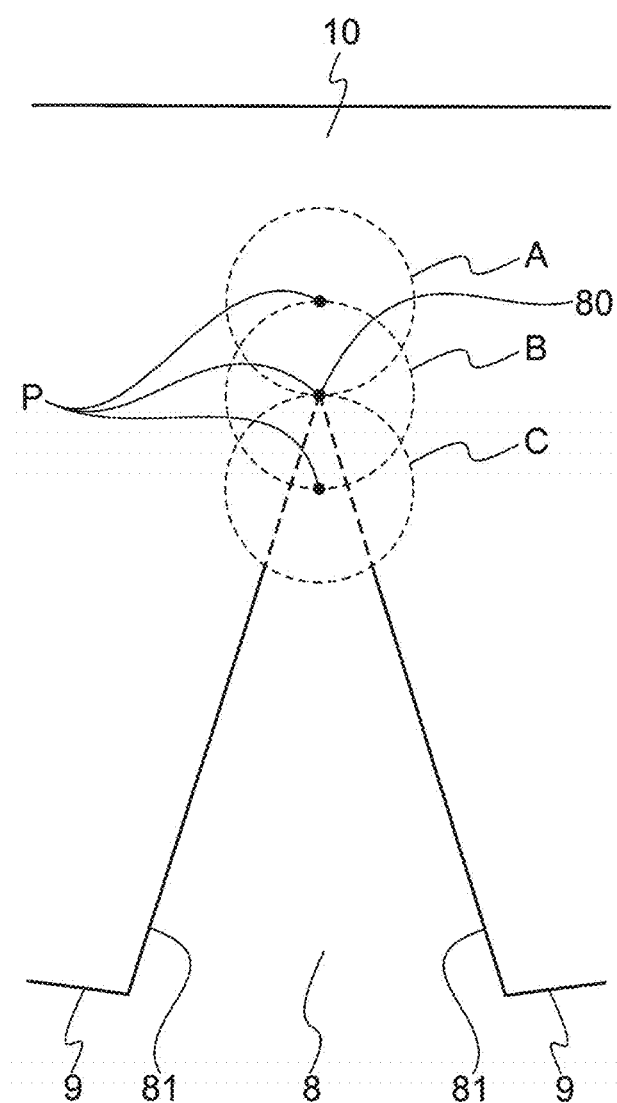
FIG. 11 is a view for illustrating a positional relationship between a central position of the relief hole and a slit vertex in FIG. 10.

FIG. 10 is a graph for showing results of measurements of the amount of increase in thickness of the core forming piece depending on the position of the relief hole. FIG. 11 is a view for illustrating a positional relationship between a center position of the relief hole and the slit vertex in the measurement of FIG. 10.

The measurement was carried out after the slit 8 and the relief hole 7 having a diameter of 3 mm were formed by processing in the core forming piece 21 having a thickness of 1 mm. As illustrated in FIG. 11, a condition in which a center P of the relief hole 7 is located at the same position as the slit vertex 80 is represented as a condition B, a condition in which the center P of the relief hole 7 is located at a position 1.5 mm away from the slit vertex 80 to the outer side in a radial direction of the laminated core 1 is represented as a condition A, and a condition in which the center P of the relief hole 7 is located at a position 1.5 mm away from the slit vertex 80 to the inner side in the radial direction of the laminated core 1 is represented as a condition C. The measurements were carried out four times for each of the conditions.

In FIG. 10, an average value d of measured amounts of increase in thickness of the core forming piece 21 when the core forming piece 21 is bent for each of the positions of the center P of the relief hole 7 is shown.

From FIG. 10, the following is understood. When the center P of the relief hole 7 is located at the same position as the slit vertex 80 (the condition B), the increase amount d of the thickness exhibits a minimum value. Accordingly, not only when the condition B is satisfied but also when the center P is located on the inner side of the slit vertex 80 in the radial direction of the core (the condition C), the increase amount d of the thickness, which is generated through compression of the core forming piece 21 when the band-shaped core member 4 is curved, is smaller than that when the center P is located on the outer side of the slit vertex 80 in the radial direction of the core (the condition A).

As described above, according to the method of manufacturing the laminated core 1 of the first embodiment, it was confirmed that the formation of the relief hole 7 at the periphery of the slit vertex 80 has the effect of suppressing the increase in thickness of the core forming piece 21 when the core forming piece 21 is bent. Further, it is desired that the center P of the relief hole 7 be set at the same position as the slit vertex 80 or at the position on the inner side of the slit vertex 80 in the radial direction of the laminated core 1.

As described above, the laminated core 1 for a rotary electric machine in the first embodiment includes the core lower layer 11 and the core upper layer 12. The core lower layer 11 includes the plurality of core forming pieces 21, each having the magnet-member insertion hole 6 and being made of the metal, which are continuously formed and are spirally rolled up as a single continuously body. The core upper layer 12 includes the plurality of core forming pieces 21 and the skewed core forming piece 22, which has a length different from that of each of the core forming pieces 21 in a longitudinal direction of the core forming pieces 21 and the skewed core forming piece 22, has the magnet-hole insertion hole 6, and is made of the metal, which are continuously formed and are spirally rolled up as a single continuous body. The core upper layer 12 is formed on the core lower layer 11 so as to be continuous with the core lower layer 11. The skewed core forming piece 22 is formed at the head of the core upper layer 12 so that the positions of the magnet-member insertion holes 6 of the core upper layer 12 are shifted from the positions of the magnet-member insertion holes 6 of the core lower layer 11 in the circumferential direction of the laminated core 1 to form the step skew. In addition, the skewed core forming piece 22 has the length longer than that of each of the core forming pieces 21 in the longitudinal direction.

With this configuration, the step skew can easily be provided to the motor core to enhance the efficiency of the motor.

The relief hole 7 is formed between the core forming pieces 21 adjacent to each other. Between the core forming pieces 21 adjacent to each other, the slit 8 defined by the two inclined sides 81 is formed. The relief hole 7 has the approximately circular shape. The center P of the relief hole 7 is set at the slit vertex 80 being the intersection between the two inclined sides 81 or on the inner side of the slit vertex 80 in the radial direction of the core forming piece 21.

With the formation of the relief hole 7 at the above-mentioned position, the increase in thickness of the portion at the periphery of the inclined sides 81 is suppressed to improve the dimensional accuracy of the height of the laminated core 1.

Further, as described above, the method of manufacturing the laminated core 1 for a rotary electric machine in the first embodiment includes the step of forming, by the press working, the core forming pieces 21, each having the magnet-member insertion hole 6, and the skewed core forming piece 22, which has the length different from that of each of the core forming pieces 21 in the longitudinal direction and has the magnet-member insertion hole 6, on the band-shaped hoop member 3 made of the metal to be fed along the longitudinal direction of the band-shaped hoop member 3, the step of forming the continuous portion for core lower layer 31 including the plurality of core forming pieces 21 continuously formed, the step of forming the continuous portion for core upper layer 32 including the plurality of core forming pieces 21 and the skewed core forming piece 22, which are continuously formed, so that the continuous portion for core upper layer 32 is continuous with the continuous portion for core lower layer 31, and the step of spirally rolling up the continuous portion for core lower layer 31 and the continuous portion for core upper layer 32 as a single continuous body. Through the formation of the skewed core forming piece 22 at a head of the continuous portion for core upper layer 32, the positions of the magnet-member insertion holes 6 of the rolled-up continuous portion for core upper layer 32 are shifted from the positions of the magnet-member insertion holes 6 of the rolled-up continuous portion for core lower layer 31 in the circumferential direction of the laminated core 1 to form the step skew.

With the manufacturing method described above, it is only required to form one skewed core forming piece 22 having a longer length in addition to the core forming pieces 21 continuously formed. In this manner, the step skew can be formed, for example, without changing an apparatus during the press working.

The manufacturing method further includes the step of forming the slit 8 defined by the two inclined sides 81 and forming the relief hole 7 at the periphery of the slit vertex 80 being the intersection between the two inclined sides 81 and the step of bending the core forming piece 21 so that the two inclined sides 81 are brought into contact with each other and spirally rolling up the band-shaped core member 4. The manufacturing method further includes the step of processing the relief hole 7 into the approximately circular shape with the slit vertex 80 or the point on the inner side of the slit vertex 80 in the radial direction of the core forming piece 21 as the center P.

Through the above-mentioned steps, the increase in thickness of the portion at the periphery of the inclined sides 81 can be suppressed to improve the dimensional accuracy of the height of the laminated core 1.

In the method of manufacturing the laminated core for a rotary electric machine 1 in the first embodiment, through the control of the feed amount of the band-shaped hoop member 3 and the timing of the press working for the magnet-member insertion hole 6, the positions of the magnet-member insertion holes 6 are shifted for every given layers of the laminated structure in the circumferential direction in which the band-shaped core member 4 is rolled up, to thereby form the step skew.

With the control described above, during the formation of the continuous core forming pieces 21, the step skew can easily be formed only with a change of an item to be controlled during the press working.

In the example described above, when the band-shaped core member 4 is manufactured, the position of the magnet-member insertion hole 6 of the skewed core forming piece 22 is shifted in a length direction of the band-shaped core member 4 by the length corresponding to the skew width. Alternatively, the magnet-member insertion hole 6 of the skewed core forming piece 22 may be formed so as to have a longer length in the circumferential direction of the laminated core 1 by the length corresponding to the skew width. Further, a plurality of the skewed forming pieces 22 may be continuously formed.

Second Embodiment

Next, a laminated core for a rotary electric machine according to a second embodiment is described with reference to FIG. 12. In the second embodiment, a skewed core forming piece has a short length.

Figure 12:
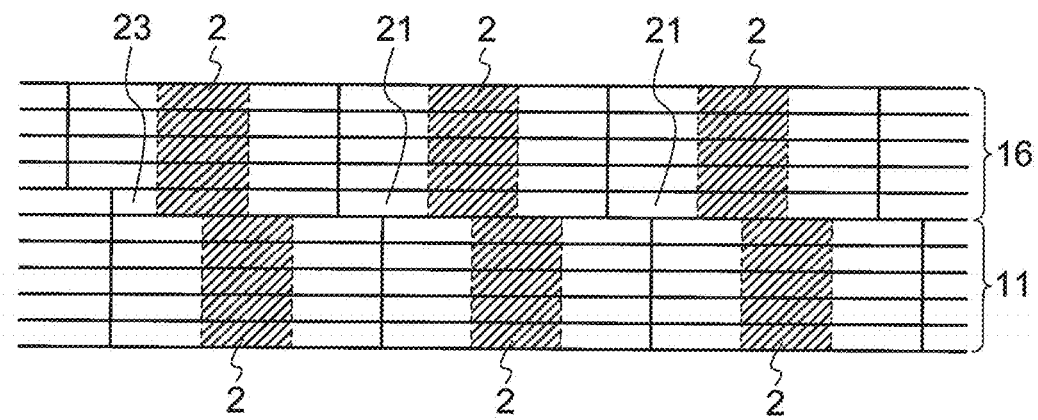
FIG. 12 is a side view of a laminated core for a rotary electric machine according to a second embodiment of the present invention.

FIG. 12 is a side view of the laminated core for a rotary electric machine according to the second embodiment. As illustrated in FIG. 12, a laminated core 100 includes two layers, specifically, a core lower layer 11 corresponding to the first band-shaped core forming body and a core upper layer 16 corresponding to the second band-shaped core forming body. The core lower layer 11 includes the core forming pieces 21 laminated in five layers. The core upper layer 16 has a laminate of the five layers. The core upper layer 16 includes a skewed core forming piece 23 formed at one position in a lowermost layer. The core upper layer 16 includes the core forming pieces 21 as the other core forming pieces in the lowermost layer and in four layers lying thereon. The skewed core forming piece 23 has a length shorter than that of each of the core forming pieces 21 by a length corresponding to the skew width in a longitudinal direction of the core forming pieces 21 and the skewed core forming piece 23. With this configuration, the positions of the magnet-member insertion holes 6 in the core upper layer 16 are shifted from the positions of the magnet-member insertion holes 6 in the core lower layer 10 in a horizontal direction to form the step skew.

A band-shaped core member before being rolled up into the laminated core 100 includes, as in the case of FIG. 3, a continuous portion for core lower layer to be used for the core lower layer 11 and a continuous portion for core upper layer to be used for the core upper layer 16. The continuous portion for core lower layer and the continuous portion for core upper layer are continuously formed. The continuous portion for core upper layer includes the skewed core forming piece 23 formed at a head at which the continuous portion for core lower layer ends so as to be continuous therewith. Subsequent to the skewed core forming piece 23, the plurality of core forming pieces 21 made of the metal are formed so as to be continuous therewith. The skewed core forming piece 23 can be processed through control of the feed amount of the band-shaped hoop member 3 and the timing of the press working for the magnet-member insertion hole 6.

As described above, in the laminated core 100 according to the second embodiment, the skewed core forming piece 23 has a shorter length than that of the core forming piece 21 in the longitudinal direction. With this configuration, the step skew can easily be formed. Further, a direction of the skew can be set so that a rotary direction thereof is opposite to that when the skewed core forming piece has the longer length. Consequently, a degree of freedom in design of the laminated core can be increased.

Third Embodiment

Next, a laminated core for a rotary electric machine according to a third embodiment is described with reference to FIG. 13. In the third embodiment, a band-shape core forming member has three layers.

Figure 13:
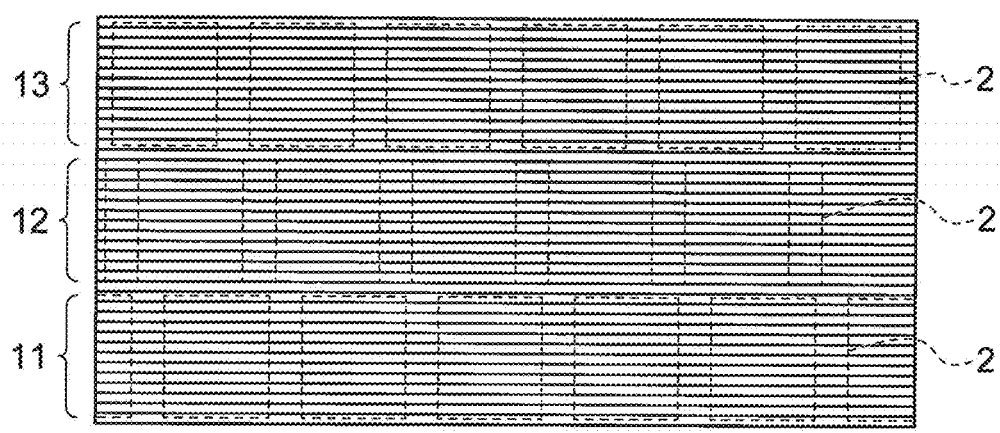
FIG. 13 is a side view of a laminated core for a rotary electric machine according to a third embodiment of the present invention.

FIG. 13 is a side view of the laminated core for a rotary electric machine according to the third embodiment. As illustrated in FIG. 13, a laminated core 101 includes an additional core layer 13 formed on the core lower layer 11 and the core upper layer 12, specifically, has three layers.

A method of manufacturing the laminated core 101 is the same as the manufacturing method in the first embodiment. First, the core lower layer 11 and the core upper layer 12 are formed. Next, the skewed core forming piece 22 is formed at a head of the additional core layer 13 so as to be continuous with the last core forming piece 21 in the core upper layer 12. Further, the plurality of core forming pieces 21 are formed so as to be continuous with the skewed core forming piece 22. The additional core layer 13 is spirally rolled up as a single continuous body together with the core lower layer 11 and the core upper layer 12 to thereby form the laminated core 101. Specifically, continuously with the core upper layer 12, the plurality of core forming pieces 21 and the skewed core forming piece 22 are rolled up as the single continuous body.

As described above, in the laminated core 101 according to the third embodiment, the plurality of core forming pieces 21 and the skewed core forming piece 22 are continuously formed. The additional core layer 13 to be spirally rolled up is formed on the core upper layer 12 so as to be continuous with the core upper layer 12.

With the structure described above, when three magnet members 2 are arranged vertically in a laminating direction in the laminated core 101, the three magnet members 2 are arranged so that phases thereof are slightly shifted from each other in a circumferential direction of the laminated core 101. As a result, step skew having a three-step structure can be formed.

Another core layer may be formed on the additional core layer 13 to form four or more layers. Further, the skewed core forming piece 23 having a length shorter than that of each of the core forming pieces 21 may be used in place of the skewed core forming piece 22 having a length longer than that of each of the core forming pieces 21. The skewed core forming piece 22 and the skewed core forming piece 23 may be used in combination. The skewed core forming piece 23 corresponds to the second core forming piece.

Each of the magnet-member insertion holes 6 is a hole having a shape similar to a sectional shape of each of the magnet members 2. Through insertion of the magnet members 2 in an axial direction of the laminated core 1 after the lamination, an IPM motor can easily be manufactured. At the time, a hole having a shape larger than the sectional shape of the magnet member 2 may be formed in advance by the press working. After the insertion of the magnet member 2, for example, a resin may be poured into the magnet-member insertion hole 6 to fill a gap between the magnet-member insertion hole 6 and the magnet member 2 so as to fix the magnet member 2.

Fourth Embodiment

Next, a laminated core for a rotary electric machine according to a fourth embodiment is described with reference to FIG. 14 to FIG. 16. In the fourth embodiment, a key groove is formed on a radially inner side of the laminated core.

Figure 14:
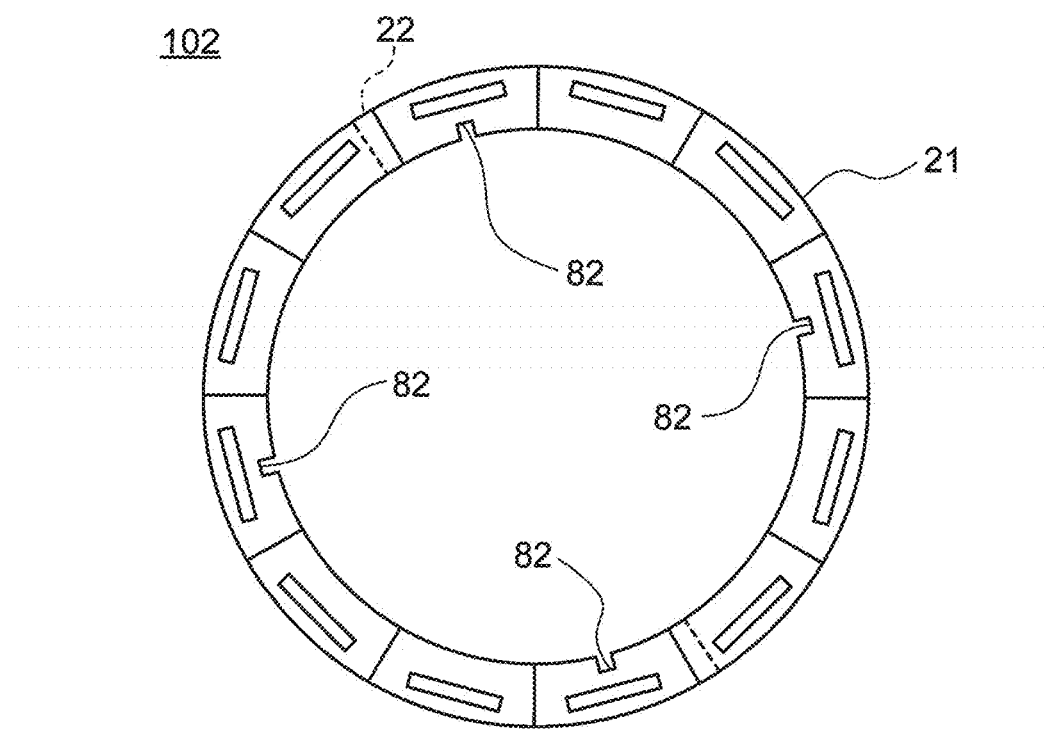
FIG. 14 is a plan view of a laminated core for a rotary electric machine according to a fourth embodiment of the present invention.

FIG. 14 is a plan view of the laminated core for a rotary electric machine according to the fourth embodiment. A laminated core 102 includes the plurality of core forming pieces 21 continuously formed in a circumferential direction of the laminated core 102 and the plurality of skewed core forming pieces 22. Key grooves 82 are formed in corresponding ones of the core forming pieces 12 and corresponding ones of the skewed core forming pieces 22 so as to be located on a radially inner side of the laminated core 102. The key grooves 82 are formed in the corresponding ones of the core forming pieces 21 and the corresponding ones of the skewed core forming pieces 22 so as to be aligned in the circumferential direction of the laminated core 102. The key grooves 82 are formed in every two core forming pieces, specifically, the core forming pieces 21 or the skewed core forming pieces 22 in the circumferential direction of the laminated core 102, which are continuously formed in the circumferential direction of the laminated core 102. In FIG. 14, the key grooves formed in the core forming pieces 21 are illustrated. In FIG. 14, the key grooves formed in the skewed core forming pieces 22, each having a longer length and being indicated by the broken line, which lie under the core forming pieces 21, are also illustrated. A rotary shaft (not shown) is mounted into the laminated core 102. The key grooves 82 are used for positioning so that a phase of the laminated core 102 and a phase of the rotary shaft match each other.

Figure 15:
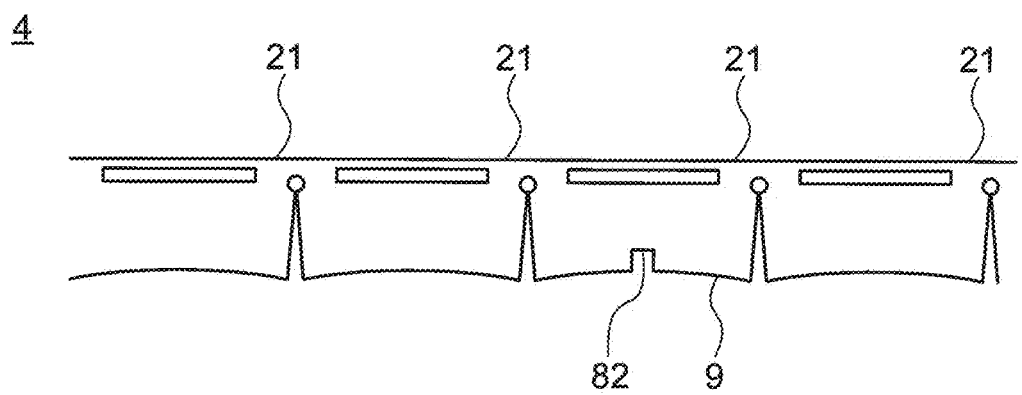
FIG. 15 is a view for illustrating a band-shaped core member configured to form the laminated core of FIG. 14.

FIG. 15 is a view for illustrating the band-shaped core member 4 configured to form the laminated core 102 of FIG. 14. The band-shaped core member 4 is spirally rolled up to form a laminate, to thereby form the laminated core 102. The key groove 82 is formed in the arc-shaped side 9. According to the laminated core 102 of the fourth embodiment, the phase matching between the shaft of the rotary electric machine and the laminated core 102 can reliably be achieved with use of the key grooves 82.

Figure 16:
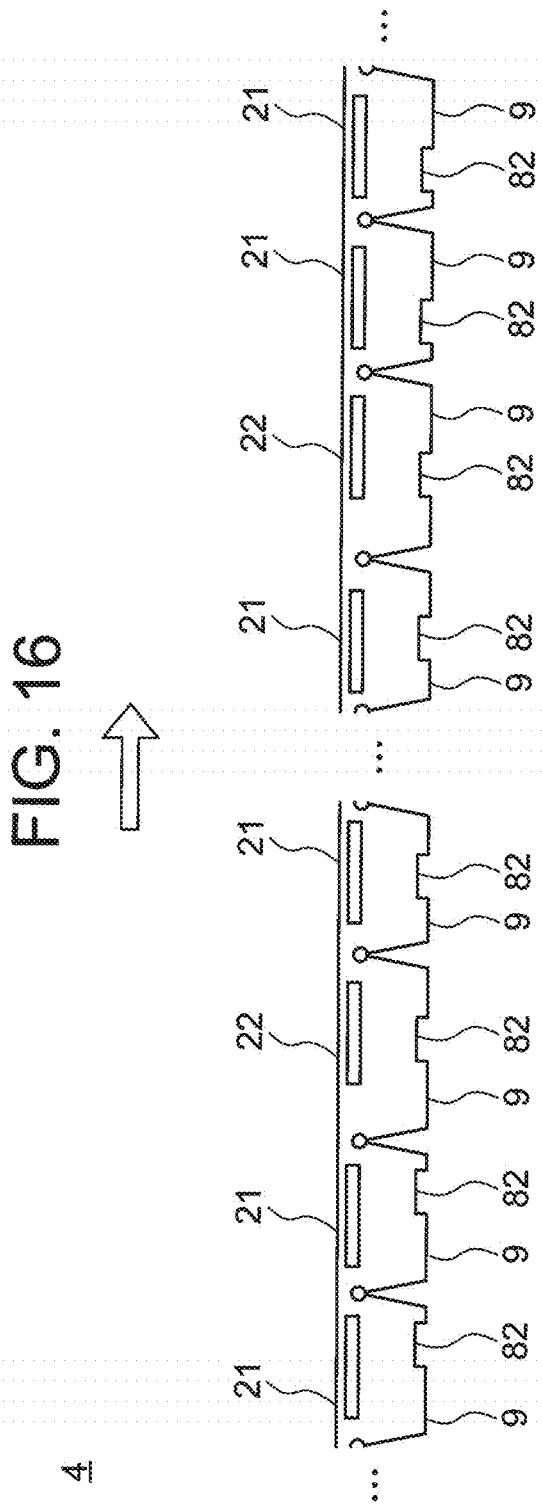
FIG. 16 is a view for illustrating a modification example of FIG. 15 and for illustrating a band-shaped hoop member configured to manufacture a three-step skew laminated core having key grooves.

FIG. 16 is a view for illustrating a modification example of FIG. 15. FIG. 16 is a view for illustrating the band-shaped core member configured to manufacture the laminated core with three-step skew having the key grooves 82. The band-shaped core member 4 is sequentially processed while being moved in a direction indicated by the arrow. In this example, the key grooves 82 are formed in all the core forming pieces 21 and the skewed core forming pieces 22. The key grooves 82 may be formed only in a lowermost layer and an uppermost layer of the laminated core 102. Instead of shifting the positions of the key grooves 82, the key groove 82 of the skewed core forming piece 22 may have such a shape that is longer than the key groove 82 of the core forming piece 21 in the circumferential direction of the laminated core 102 by the length corresponding to the skew width.

With reference to FIG. 16, the positions of the key grooves 82 to be formed in the core forming pieces 21 and the skewed core forming pieces 22 are described. The key groove 82 serving as a reference is formed in a center of the circle side 9 of the core forming piece 21 in a second layer from the bottom in the laminated core 102 with the three-step skew. The layer numbers are defined as a first layer, the second layer, and a third layer in the stated order from a lowermost layer of a spiral core forming body layer. Each of the key grooves 82 of the core forming pieces 21 in the first layer is formed at a position shifted from the center of the arc-shaped side 9 of the core forming piece 21 toward the core forming piece 21 in the second layer by the length corresponding to the skew width, specifically, at a position of the center of the arc-shaped side 9 shifted through forward movement of the band-shaped core member 4 by the length corresponding to the skew width with respect to the press machine. The key groove 82 of the skewed core forming piece 22 at a head of the second layer is formed at a position shifted toward the core forming pieces 21 in the second layer by the length corresponding to the skew width. The position of the key groove 82 of the skewed core forming piece 22 is shifted from the center of the arc-shaped side 9 of the skewed core forming piece 22 toward the core forming pieces 21 in the second layer by half of the skew width. With this configuration, the positions of each of the key groove 82 in the second layer is aligned with the position of the key groove 82 in the first layer.

The key grooves 82 of the core forming pieces 21 in the third layer are formed at positions shifted from the centers of the arc-shaped sides 9 of the core forming pieces 21 toward the core forming pieces 21 in the second layer at positions of the centers of the arc-shaped sides 9 shifted through forward movement of the band-shaped core member 4 by the length corresponding to the skew width with respect to the press machine. The key groove 82 of the skewed core forming piece 22 at a head of the third layer is formed at a position shifted toward the core forming pieces 21 in the second layer by the length corresponding to the skew width. The position of the key groove 82 of the skewed core forming piece 22 is shifted from the center of the arc-shaped side 9 of the skewed core forming piece 22 toward the core forming pieces 21 in the second layer by half of the skew width. With the above-mentioned shift of the position of the key groove 82, the positions of the key grooves 82 in the third layer are aligned with the positions of the key grooves 82 in the first layer and the positions of the key grooves 82 in the second layer. With this configuration, the respective core forming pieces 21 and the respective skewed core forming pieces 22, which are laminated, have a series of the respective key grooves 82 aligned in the axial direction of the laminated core 102.

The key groove 82 can be formed by the press working. In this case, a die configured to form the key groove 82 is provided independently of the arc die 43 configured to form the arc-shaped side 9 of each of the core forming pieces 21 and the skewed core forming pieces 22. However, a die obtained by additionally providing a portion for the formation of the key groove 82 to the arc die 43 configured to form the arc-shaped side 9 may be used.

According to the fourth embodiment, the processing of the key grooves 82 can be facilitated. Further, according to the laminated core 102 of the modification example, through the formation of the key grooves 82 in all the core forming pieces 21 and the skewed core forming pieces 22, the phase matching between the shaft of the rotary electric machine and the laminated core 102 can more reliably be achieved.

Figure 17:
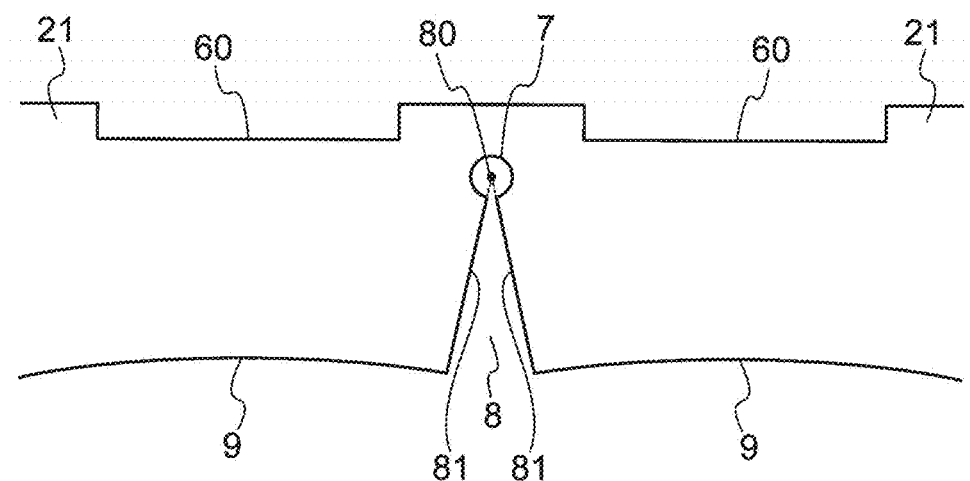
FIG. 17 is a side view of a laminated core for a rotary electric machine, which is a modification example of the embodiments.

Further, as illustrated in FIG. 17, the magnet-member insertion hole 6 may be formed at a position shifted to the radially outer side of the laminated core 1 to eliminate an outer side of the magnet-member insertion hole 6 so as to be formed as a magnet-member mounting groove 60. In this case, instead of being inserted from an upper surface or a lower surface of the laminated core 1 after the lamination of the core, the magnet member 2 is bonded to an outer periphery of the laminated core with, for example, an adhesive.

As described above, with a combination of the width and the thickness of the band-shaped hoop member 3, the shapes of the dies for the press machine 40, the timing of the press working, and the number of laminated layers, laminated cores having a wide variety of shapes can easily be manufactured.

As a method of forming the step skew, instead of using the method of forming the skewed core forming piece 22, the laminated core with the skew may be obtained through control of the feed amount of the band-shaped hoop member 3 and a roll-up amount of the rotary table 41 and timing of pressing and punching for the magnet-member insertion hole 6, the slit 8, and the arc-shaped side 9 in synchronization with each other. As a result, a designed number of the core forming pieces 21, each having a desired shape, can easily be processed at suitable positions on the band-shaped hoop member 3. At this time, it is desired that a rotation speed of the rotary table 41 be set so that the feed amount of the band-shaped hoop member 3 and the amount of core forming piece 21 to be rolled up by the rotary table 41 become equal to each other.

According to the manufacturing method of the above-mentioned embodiment of the present invention, the press working is used. Accordingly, in comparison to a laminated core manufactured through casting, the laminated core can be manufactured inexpensively. For example, for the laminated core formed by casting, a hole or a groove into which the magnet member 2 is to be mounted is required to be formed by cutting, which is difficult to perform. According to the manufacturing method of the first embodiment, however, the magnet-member insertion hole 6 can easily be formed by the process working, which is extremely easy to perform.

Further, according to the manufacturing method of the above-mentioned embodiments of the present invention, a higher yield is obtained as compared to a yield obtained by the following method of manufacturing a laminated core. Specifically, after a magnetic steel plate being a thin plate is processed into an annular shape by the press working at one time, the magnetic steel plates, each having the annular shape, are laminated. In particular, in a large-size motor core such as a motor core for a hoisting machine for an elevator, reduction in manufacturing costs can be achieved.

Fifth Embodiment

Figure 18:
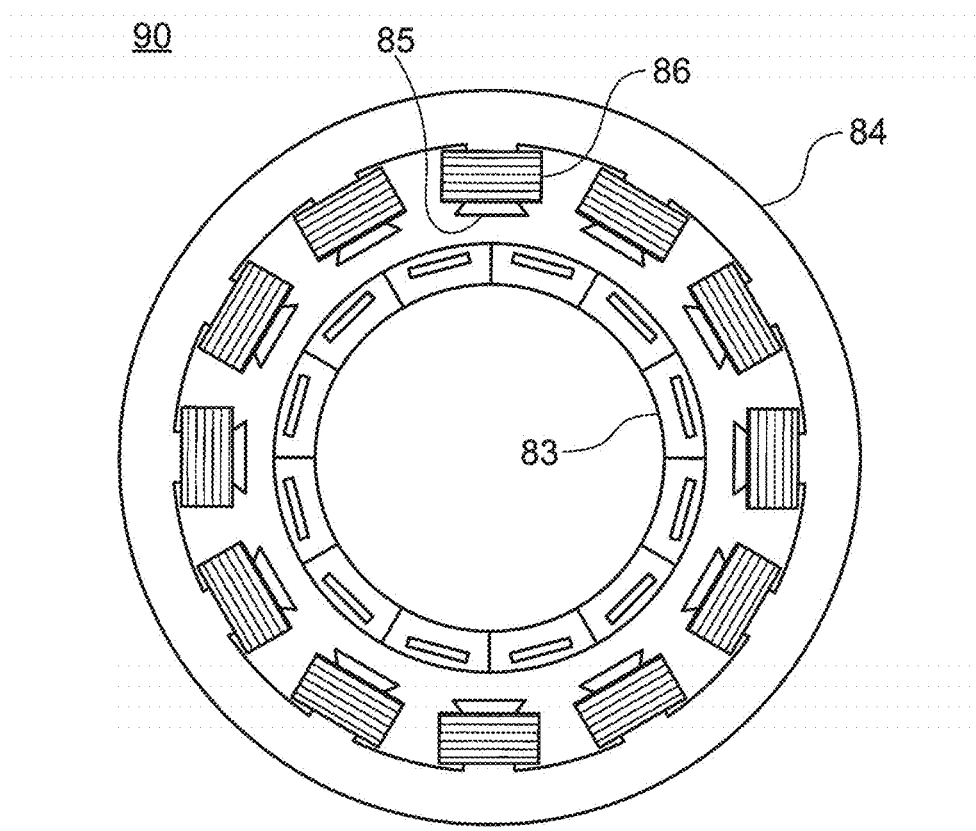
FIG. 18 is a schematic sectional view for illustrating a rotary electric machine in which the laminated core is mounted, which is taken along an axial direction of the rotary electric machine.

Next, a rotary electric machine according to a fifth embodiment is described with reference to FIG. 18. FIG. 18 is a schematic sectional view for illustrating a rotary electric machine in which the laminated core 1 is mounted, which is taken along an axial direction of the rotary electric machine. In FIG. 18, with importance placed on clarity of the illustration, hatching and illustration of a rotary shaft are omitted.

A rotary electric machine 90 according to the fifth embodiment includes a rotor 83 and a stator 84. The rotor 83 has a cylindrical shape. The rotor 83 includes the laminated core 1 described in the first embodiment. A rotary shaft (not shown) is mounted into the rotor 83. The rotor 83 is rotatable together with the rotary shaft (not shown). The stator 84 is provided so as to be opposed to an outer side of the rotor 83. The stator 84 has a cylindrical shape concentric with the rotor 83. The stator 84 includes a stator core 85 and a coil 86. The coil 86 is wound around the stator core 85. The configuration of the stator 84 is not particularly limited and an existing configuration may be used.

As described above, according to the rotary electric machine 90 including the laminated core 1, a cogging torque can be reduced to enhance efficiency of the motor. In the fifth embodiment, the laminated core 1 is used for the rotor 83. However, any one of the laminated cores 100 to 102 may be used.

REFERENCE SIGNS LIST

1, 100, 101, 102 laminated core, 3 band-shaped hoop member, 6 magnet-member insertion hole (magnet mounting portion), 7 relief hole, 8 slit, 11 core lower layer (first band-shaped core forming body), 12, 16 core upper layer (second band-shaped core forming body), 21 core forming piece (first core forming piece), 22, 23 skewed core forming piece (second core forming piece), 31 continuous portion for core lower layer, 32 continuous portion for core upper layer, 60 magnet-member mounting groove (magnet mounting portion), 80 slit vertex (intersection), 81 inclined side, 90 rotary electric machine, P center

The invention claimed is:

1. A laminated core for a rotary electric machine, comprising:
a first spiral core forming body layer including a plurality of first core forming pieces, each being made of a metal and having a magnet mounting portion, the plurality of first core forming pieces being continuously formed and to be spirally rolled up as a single continuous body; and
a second spiral core forming body layer including a plurality of the first core forming pieces and at least one second core forming piece, which has a length different from a length of each of the plurality of first core forming pieces in a longitudinal direction of each of the first core forming pieces and the second core forming piece, has the magnet mounting portion, and is made of the metal, the plurality of first core forming pieces and the at least one second core forming piece being continuously formed and to be spirally rolled up as a single continuous body,
wherein the second spiral core forming body layer is formed on the first spiral core forming body layer so as to be continuous with the first spiral core forming body layer,
wherein the at least one second core forming piece is located at a head of the second spiral core forming body layer, and
wherein positions of the magnet mounting portions of the plurality of first core forming pieces and the at least one second core forming piece in the second spiral core forming body layer are shifted from positions of the magnet mounting portions of the plurality of first core forming pieces in the first spiral core forming body layer in a circumferential direction of the laminated core under a state in which the second spiral core forming body layer is formed on the first spiral core forming body layer.

2. The laminated core for a rotary electric machine according to claim 1, wherein the at least one second core forming piece has the length longer than the length of each of the plurality of first core forming pieces in the longitudinal direction.

3. The laminated core for a rotary electric machine according to claim 1, wherein the at least one second core forming piece has the length shorter than the length of each of the plurality of first core forming pieces in the longitudinal direction.

4. The laminated core for a rotary electric machine according to claim 1, wherein a relief hole is formed between adjacent ones of the plurality of first core forming pieces and the at least one second core forming piece.

5. The laminated core for a rotary electric machine according to claim 4,
wherein a slit defined by two inclined sides is formed between adjacent ones of the plurality of first core forming pieces and the at least one second core forming pieces,
wherein a shape of the relief hole comprises an approximately circular shape, and
wherein a center of the relief hole is located at an intersection between the two inclined sides or on an inner side of the intersection in a radial direction of each of the plurality of first core forming pieces and the at least one second forming piece.

6. The laminated core for a rotary electric machine according to claim 1, wherein at least one spiral core forming body layer including a plurality of the first core forming pieces and the at least one second core forming piece, which are continuously formed and are to be rolled up as a single continuous body, is formed on the second spiral core forming body layer so as to be continuous with the second spiral core forming body layer.

7. A method of manufacturing a laminated core for a rotary electric machine, comprising the steps of:
forming, through press working, first core forming pieces, each having a magnet mounting portion, and at least one second core forming piece, which has a length different from a length of each of the plurality of first core forming pieces in a longitudinal direction of each of the plurality of first core forming pieces and the at least one second core forming piece, and has a magnet mounting portion, on a band-shaped hoop member made of a metal to be fed along a longitudinal direction of the band-shaped hoop member;
forming a first band-shaped core forming body including a plurality of the first forming pieces continuously formed;
forming a second band-shaped core forming body including a plurality of the first core forming pieces and the at least one second core forming piece, which are continuously formed so that the second band-shaped core forming body is continuous with the first band-shaped core forming body; and spirally rolling up the first band-shaped core forming body and the second band-shaped core forming body as a single continuous body, including a first spiral core forming body layer and a second spiral core forming body layer wherein positions of the magnet mounting portions of the plurality of first core forming pieces and the at least one second core forming piece in the second spiral core forming body layer are shifted from positions of the magnet mounting portions of the plurality of first core forming pieces in the first spiral core forming body layer in a circumferential direction of the laminated core under a state in which the second spiral core forming body layer is formed on the first spiral core forming body layer.

8. The method of manufacturing a laminated core for a rotary electric machine according to claim 7, further comprising the steps of:

forming a slit defined by two inclined sides between adjacent ones of the plurality of first core forming pieces and the at least one second core forming piece and a relief hole at a periphery of an intersection between the two inclined sides; and curving the first band-shaped core forming body and the second band-shaped core forming body so that the two inclined sides are brought into contact with each other and spirally rolling up the first band-shaped core forming body and the second band-shaped core forming body.

9. The method of manufacturing a laminated core for a rotary electric machine according to claim 8, further comprising the step of forming the relief hole into an approximately circular shape having the intersection between the two inclined sides or a point on an inner side of the intersection in a radial direction of the first core forming piece as a center.

10. A rotary electric machine, comprising:
a laminated core including:
a first spiral core forming body layer including a plurality of first core forming pieces, each being made of a metal and having a magnet mounting portion, the plurality of first core forming pieces being continuously formed and to be spirally rolled up as a single continuous body; and a second spiral core forming body layer including a plurality of the first core forming pieces and at least one second core forming piece, which has a length different from a length of each of the plurality of first core forming pieces in a longitudinal direction of each of the first core forming pieces and the second core forming piece, has the magnet mounting portion, and is made of the metal, the plurality of first core forming pieces and the at least one second core forming piece being continuously formed and to be spirally rolled up as a single continuous body, wherein the second spiral core forming body layer is formed on the first spiral core forming body layer so as to be continuous with the first spiral core forming body layer, wherein the at least one second core forming piece is located at a head of the second spiral core forming body layer, and wherein positions of the magnet mounting portions of the plurality of first core forming pieces and the at least one second core forming piece in the second spiral core forming body layer are shifted from positions of the magnet mounting portions of the plurality of first core forming pieces in the first spiral core forming body layer in a circumferential direction of the laminated core under a state in which the second spiral core forming body layer is formed on the first spiral core forming body layer.

* * * * *